M. L. TUCKER.
GEOGRAPHICAL GAME APPARATUS.
APPLICATION FILED MAY 10, 1910.
989,209.
Patented Apr. 11, 1911.
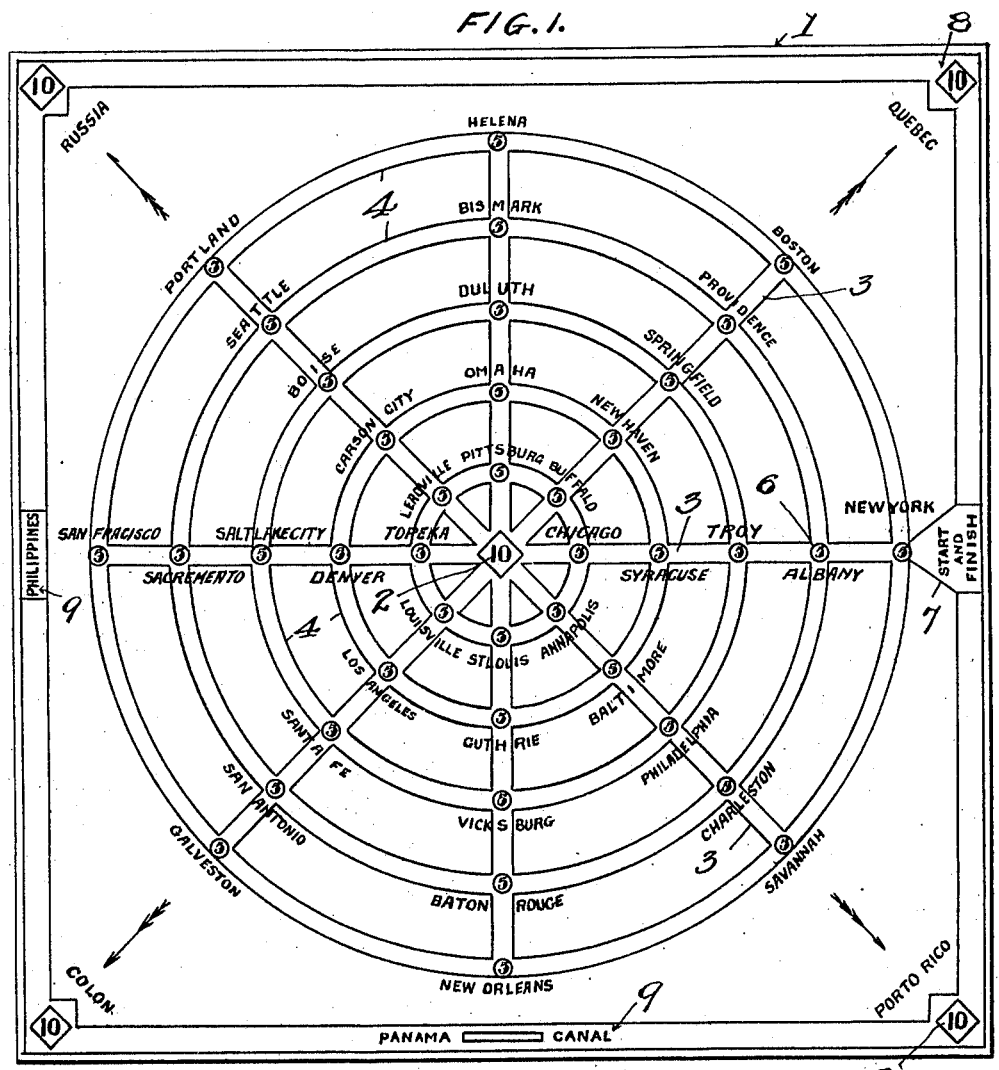
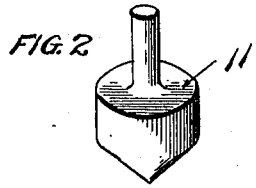
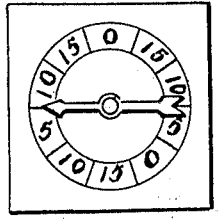

UNITED STATES PATENT OFFICE.

MARY L. TUCKER, OF NEW YORK, N. Y.

GEOGRAPHICAL-GAME APPARATUS.

989,209.  Specification of Letters Patent.  Patented Apr. 11, 1911.

Application filed May 10, 1910. Serial No. 560,427.

*To all whom it may concern:*

Be it known that I, MARY L. TUCKER, a citizen of the United States, and a resident of New York city, New York, have invented a new and useful Geographical-Game Apparatus, of which the following is a specification.

A principal object of my invention is to provide a game board on which the names of the principal cities are arranged in a geometrical form as nearly as possible in their relative geographical positions. Games played on this board are interesting and amusing and also instructive since the player involuntarily notices the geographical relation of each city to which his attention is directed during play, to the other cities on the board. The geometrical arrangement of the board may vary considerably but in a preferred form I select Washington, D. C., as the center of the board and arrange around the center point concentric circles with radial lines conveniently eight in number, extending from the center to the larger circle. At the crossing points of the lines and circles are location points each marked with a value and identified with the name of a city and the cities are arranged on each of the radial lines as nearly as possible in their approximate geographical relation to each other and to the center point Washington. Preferably, around the border of the chart are arranged other location points outside the limits of the United States and each of these may be marked with a certain value.

In connection with the board I provide one or more chance devices such as teetotums, counters and a flag pin, the uses of which will be described.

I will now describe a representative form in which my invention may be embodied and the game which may be played with the board and its appurtenances and some of the possible variations in the game.

In the drawing Figure 1 is a top view of the board. Fig. 2 shows a teetotum. Fig. 3 shows counters; Fig. 4 shows the flag pin, and Fig. 5 shows a spinning indicator.

The board 1 is conveniently square and has a center point 2 in which is placed the value 10. This point may be marked, or if not marked is understood, in the particular form of the invention shown, to be Washington, D. C. Radiating from the center are a plurality of lines or paths 3, conveniently eight in number, extending toward each of the principal points of the compass.

Concentric with the center point are a plurality of circular lines or paths 4, the outer one of which limits the radial lines. At the intersection of the circles and radial lines are location points 6 in each of which is placed the value five, and each of these location points is identified with the name of a city, the cities being arranged as nearly in their correct geographical relation to each other and especially to the center point Washington as their arrangement in the prescribed geometrical manner will permit.

Outside the point New York, an inclosure 7 is outlined on the board extending to the margin and this inclosure is marked "Start and Finish." At the corners of the board are placed additional location points 8 and these are marked with the valuation 10 and identified with the names of countries or cities outside the limits of the United States. At additional places in the margin are additional location points 9 marked with the names of points of geographical interest outside the United States, and increased valuations are given to these points, for instance, for the Philippines the value of fifteen is usually assigned and for the Panama Canal the value of twenty-five points, but these values may be changed at the discretion of the players.

Accompanying the board are one or more teetotums 11, a suitable plurality of chips or counters 12 and a flag pin 13.

The game may be played with two or four persons. Each player is provided with a suitable number of counters 12 and a teetotum may be provided for each player and when this is done one of the teetotums may be colored red, another blue, the third white and the fourth with a combination of the national colors. The players place their supply of counters at their right hands and spin the teetotum in turn on the board. The counters have a value of five each. If the teetotum stops at or near one of the location points marked five, for instance Baltimore, the player transfers one counter from the supply at his right hand to another position near his left hand indicating that he has advanced five points. If the teetotum stops at or near the center point, Washington, ten points are scored and the player who spun the top is entitled to place the flag pin in the center point. If the teetotum stops near the corners, for instance Quebec, ten points are scored and if it stops at the Philippines fifteen points and at the Panama Canal twenty-five points. The game thus proceeds, each player spinning in turn until the highest player reaches a specific number of points, when he is declared the winner.

The playing of the game may be varied by providing an indicator marked with different values and having a needle to be spun. The players spin the needle in turn and in accordance with the value on which it stops move a marker from the starting point over the paths in a certain way until they reach the center point. To illustrate, the player on spinning the needle is entitled to a count of fifteen points. He commences at the starting point New York and counts around the outer circle in a left-hand direction to Portland where he places a marker until he next spins. Each player thus progresses, his advance being indicated by his marker around the outer circle until he reaches New York again. Then one step inward to the next circle and so in a left-hand direction around that circle; and so on until the center is reached. Arriving at Washington, the center point, the players retrace their path in a similar manner to New York or else may return directly along the radial line as is agreed.

The game has great instructive value because at each play the participants are required to notice some city and its geographical position in relation to the other cities indicated.

The game may of course be arranged with other cities than Washington as the center point and otherwise modified accordingly.

I claim:

1. A geographical game comprising a board having a center point, a geometrical figure arranged around the center point, and location points on the geometrical figure identified with the names of cities arranged in their approximate geographical relation.

2. A geographical game comprising a board having a center point, concentric circles about the center point, radial lines extending from the center point and location points at the intersections of the circles and lines, each point being marked with a certain value and identified with a geographical name, these names being arranged approximately in their geographical relation.

3. In a geographical game apparatus, the combination of a board having thereon a geometrical figure and location points on the geometrical figure identified with geographical names arranged approximately in correct geographical relation, each point being marked with a certain value, and a chance device for indicating the movement of counters upon said board.

MARY L. TUCKER.

Witnesses:
D. W. SMITH,
L. B. AVEILHÉ.

Copies of this patent may be obtained for five cents each, by addressing the "Commissioner of Patents, Washington, D. C."